Sept. 21, 1954
S. N. DUNTON
2,689,754
SAFETY COUPLING
Filed Nov. 3, 1950
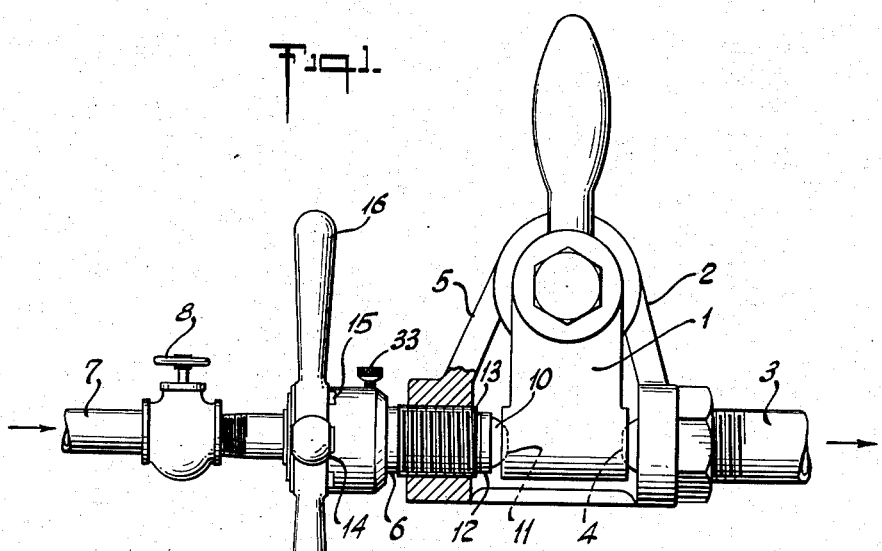
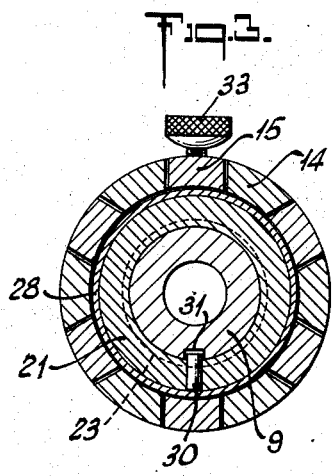
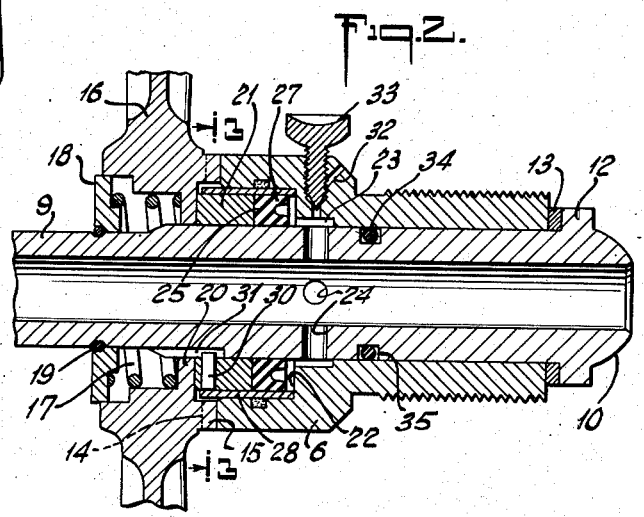
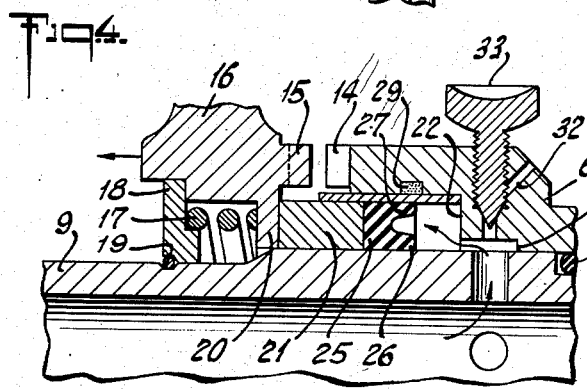
INVENTOR:
STANLEY N. DUNTON.
BY
Curtis, Morris & Safford.
ATTORNEYS.

Patented Sept. 21, 1954

2,689,754

UNITED STATES PATENT OFFICE 2,689,754

SAFETY COUPLING

Stanley N. Dunton, City Island, N. Y., assignor to Thomas C. Wilson, Inc., Long Island City, N. Y., a corporation of New York Application November 3, 1950, Serial No. 193,895

11 Claims. (Cl. 285—181)

The present invention relates to a safety coupling or union. One object thereof has been to provide a device of this character which may be advantageously employed in connection with apparatus such as fuel oil burners of the variable capacity type, or the like.

In the operation of steam plants using variable capacity atomizers or burners on ships and elsewhere, various circumstances require repeated removals of the burner for replacement, repairs or the like. The great hazard is that such removal may be attempted while oil under pressure is still reaching the burner either because the control valve is faulty or the operator may neglect to close it. In either case, injury and damage, even loss of life, may result from the ignition of oil on loosening or removal of the burner.

A further object of this invention has been to provide a coupling or union of simple and durable construction which may be employed not only to effectively connect the burner or nozzle into the fuel line but also to render the burner safe against removal and the joint safe against opening as long as it is subjected to dangerous pressure.

A device according to the invention comprises in general a conduit member having means at its inlet end for connection with a fuel line or the like and means at its discharge end for connection with a burner or atomizer or other pipe or conduit, a sleeve rotatably mounted on said conduit and having a threaded shank adapted for cooperation with a suitable support to clamp the burner, or other conduit supported thereby, in fuel receiving relation to said conduit, a sleeve turning device including clutch means having parts operatively interengageable with and disengageable from each other, spring means for biasing said turning device toward sleeve turning position, and means arranged and adapted to move and hold said turning device out of sleeve turning position by operation of pressure in the conduit.

An apparatus employing this invention and illustrating one embodiment thereof is shown in the drawings accompanying this specification and wherein Figure 1 is a side elevation, partly in section showing a safety union or coupling operatively applied to a conventional type of variable capacity burner or atomizer and with the parts disposed in relative positions occupied by them when no pressure is operating in the burner;

Figure 2 is a fragmentary view on enlarged scale in central longitudinal section, showing certain parts in their relative positions as shown in Figure 1 and with no pressure operating thereon;

Figure 3 a cross section in the line 3—3 of Figure 2; and

Figure 4 a fragmentary view on enlarged scale and in central longitudinal section showing certain parts in their relative positions resulting from pressure operating thereon.

Referring to the drawings, a safety coupling according to the invention is shown as applied to a variable capacity oil burner or atomizer 1 of a conventional type supported by a yoke or frame. One leg 2 of said yoke or frame is threaded to receive a threaded portion of an excess fuel discharge pipe 3 having a convexly rounded end face which, in assembled relation, engages a correspondingly concave seat 4 in the burner 1.

The other leg 5 of said yoke or frame is threaded to receive and support the threaded shank of a clamping sleeve 6 forming part of the safety coupling through which fuel is carried from a supply line 7 conveniently controlled by a suitable valve 8. Thus, fuel oil is supplied in the desired controlled volume through valve 8 and the safety coupling to burner 1; and the excess thereof discharges from said burner through discharge pipe 3 in a known manner.

As seen more clearly in Figure 2, the safety coupling illustrated in the drawings includes a connector pipe or conduit 9 threaded at its inlet end for connection with the fuel line 7 through the valve 8. The discharge end of said conduit 9 is convexly rounded at 10 to fit in a correspondingly concave seat 11 in burner 1. Conduit 9 also has a peripheral flange or abutment 12 adjacent the threaded end of sleeve 6 and of a diameter which may pass freely through said threaded opening in leg 5. Thus when said sleeve is engaged with said threaded opening as shown and turned in a direction to advance inwardly toward burner 1, the leading end of said sleeve presses against said flange 12 through a washer 13 and clamps said conduit end 10 in operative fuel transmitting engagement with the burner 1.

Bolt 6 is formed with an enlarged cylindrical head portion provided at its open end edge with a series of spaced teeth 14 extending outwardly and in position to be engaged by corresponding teeth 15 projecting from the hub portion of a turning handle or turner 16 which is mounted coaxially with sleeve 6 on conduit 9. This arrangement provides in effect a clutch whereby, when teeth 15 engage between teeth 14, an operator is able to actuate sleeve 6 by turning handle 16 and thus tighten or loosen conduit 10 in relation to burner 1. When said teeth are disengaged, however, said sleeve 6 cannot be moved by turning handle 16 and conduit 9 remains clamped in operative relation to burner 1.

Handle 16 is biased toward turning engagement with sleeve 6 by a spring 17 interposed between a retainer plate or abutment 18 held on conduit 9 by a ring 19 and an annular flange 20 of handle 16. The latter is centrally recessed to permit limited movement thereof longitudinally of pipe 9 for effecting engagement and disengagement of teeth 15 between teeth 14.

To render or retain the handle 16 inoperative, or so that it turns freely by reason of its being automatically retained out of operative turning connection with sleeve 6, a thrust ring 21 is slidably mounted on conduit 9 in an annular space located between flange 20 of handle 16 and an interiorly exposed annular shoulder 22 of sleeve 6. This space affords in effect a cylinder chamber in which ring 21 moves as a piston biased inwardly by spring 17 and is moved outwardly and held in outward position by pressure of the fuel in conduit 9.

For this purpose, sleeve 6 is formed with an annular recess or passageway 23 connecting with said cylinder chamber behind the piston or thrust ring 21. Ports 24 extend radially through the wall of conduit 9 in such position that, when the parts are assembled as shown in Figure 1, the outer ends of said ports 24 open into the annular recess 23. A seal ring 25, preferably of neoprene rubber or equivalent is mounted to slide on conduit 9 along with the piston ring 21. An inner annular flange 26 of said seal ring 25 bears against a portion of the outer wall surface of conduit 9 and an outer annular flange 27 thereof bears against a sleeve 28 advantageously secured in the piston recess or cylinder chamber of sleeve 6 by solder 29, as tin, disposed in an annular groove opening through a portion of the inner wall surface of said chamber. Said sleeve serves as a guide and retaining member for the thrust ring 21 and the seal ring 25 operating together in effect as a piston. Said thrust ring 21 is held against rotation on conduit 9 by a pin 30, the inner end of which projects into a longitudinal groove 31 in an outer portion of the wall of conduit 9.

In operation, with the parts assembled initially as shown in Figure 1, sleeve 6 is turnable in either direction by means of the handle 16 to tighten or to loosen the burner fitting in its supporting yoke. However, when valve 8 is opened, fuel under pressure is admitted to conduit 9. Thus, pressure is transmitted through ports 24 and recess 23 to the piston chamber behind seal ring 25 which, in moving outwardly, forces thrust ring 21 against flange 20 of handle 16, thus moving teeth 15 out of engagement with teeth 14. While such pressure persists, handle 16 is held in this disengaged position against the resistance of spring 17; and burner 1 cannot be loosened or removed by turning said handle. Accordingly, to remove said burner, pressure in the fuel line 7 must be shut off, as by closing valve 8. Remaining back pressure, if any, is relieved through a bleed port 32 connecting with the annular recess 23 and controlled by the valve piece 33.

A sealing ring 34 preferably of neoprene rubber or other suitable material engages a groove 35 of sleeve 6 to prevent leakage between conduit member 9 and said sleeve 6. The seal ring 25 serves to prevent leakage from recess 23 past the thrust ring 21.

Although the illustrated embodiment of the present invention has been shown and described in connection with fuel oil burner apparatus, the scope of use of the invention is not so limited. Nor is useful embodiment thereof limited to the specific parts or relationships shown and described above, it being contemplated that the invention is capable of being embodied in various forms and arrangements constituting equivalents of those hereinabove more specifically indicated.

I claim:

1. A safety coupling device comprising a member having on opening to which a conduit is to be connected, a frame part in fixed relation with respect to said member and having an internally-threaded aperture, a conduit extending through said aperture and having an end portion to be connected to said opening, a rotatable sleeve on said conduit, said sleeve having an externally-threaded portion threadedly fitting into the threaded aperture of said frame part, said sleeve and conduit having interengageable portions such that the end portion of said conduit may be forced into fluid-tight connection with the opening in said member by movement of said sleeve in one direction through the aperture in the frame part, rotatable means for rotating the sleeve mounted on said conduit and movable toward and away from said sleeve, clutch elements connected to said sleeve and said sleeve-rotating means, respectively, and engageable to connect said sleeve-rotating means and said sleeve for rotary movement in unison, a piston chamber in pressure-transmitting communication with the interior of the conduit, and a piston slidable within said chamber toward and away from said sleeve-rotating means, said piston being operable by fluid pressure from said conduit to effect movement of said sleeve-rotating means to disengage said clutch elements from one another and thereby render the sleeve-actuating means inoperative to rotate said sleeve.

2. A safety coupling device as set forth in claim 1 in which both the sleeve and the sleeve-rotating means are rotatable relative to said conduit.

3. A safety coupling device as set forth in claim 2 in which the conduit has a pair of spaced, radially-projecting abutments, the sleeve is mounted on said conduit between said abutments, a spring surrounds said conduit between one of said abutments and a portion of the sleeve-rotating means and exerts a pressure against the sleeve rotating means in a direction tending to move the clutch elements carried thereby into engagement with the clutch elements carried by the sleeve.

4. A safety coupling device as set forth in claim 1 in which the piston chamber is formed in the sleeve.

5. A safety coupling device as set forth in claim 1 which includes biasing means tending to move said sleeve-rotating means in a direction to cause engagement of said clutch elements.

6. A safety coupling device as set forth in claim 5 in which the biasing means is a spring surrounding said conduit, the conduit has a radially-projecting abutment and the spring is interposed between said abutment and a portion of the sleeve-rotating means.

7. A safety coupling device as set forth in claim 1 which includes manual control means for permitting escape of fluid under pressure from said piston chamber.

8. A safety coupling device as set forth in claim 1 in which the conduit has a generally-radially-extending port through its wall and the piston chamber is in pressure-transmitting communication with the interior of the conduit through said port.

9. A safety coupling device as set forth in claim 1 in which the piston chamber and piston are annular and coaxial with said conduit.

10. A safety coupling device as set forth in claim 8 in which the piston is slidable along said conduit.

11. A safety coupling device as set forth in claim 9 which includes an annular sealing ring within the piston chamber and the inner and outer annular sides of the ring engage the outside of the conduit and the inner surface of the piston chamber, respectively, and another side of the ring bears against the piston.

References Cited in the file of this patent

UNITED STATES PATENTS

| Number | Name | Date |
|---|---|---|
| 1,844,631 | Bragg et al. | Feb. 9, 1932 |
| 1,858,013 | Heins | May 10, 1932 |
| 2,276,424 | Siversen | Mar. 17, 1942 |
| 2,340,999 | Trott | Feb. 8, 1944 |
| 2,456,203 | Loepsinger | Dec. 14, 1948 |